United States Patent
Reichelt et al.

[11] Patent Number: 5,763,612
[45] Date of Patent: Jun. 9, 1998

[54] BENZOPYRAN DYES AND THEIR INTERMEDIATES

[75] Inventors: Helmut Reichelt, Neustadt; Clemens Grund, Mannheim; Gerhard Wagenblast, Wachenheim, all of Germany

[73] Assignee: BASF Aktiengesellschaft, Ludwigshafen, Germany

[21] Appl. No.: 849,138

[22] PCT Filed: Nov. 25, 1995

[86] PCT No.: PCT/EP95/04658

§ 371 Date: Jun. 5, 1997

§ 102(e) Date: Jun. 5, 1997

[87] PCT Pub. No.: WO96/17893

PCT Pub. Date: Jun. 13, 1996

[30] Foreign Application Priority Data

Dec. 7, 1994 [DE] Germany .................. 44 43 414.6

[51] Int. Cl.⁶ ............................................ C09B 57/02
[52] U.S. Cl. ............................ 546/52; 548/305.1; 8/648
[58] Field of Search ...................... 548/305.1; 546/52; 8/648

[56] References Cited

U.S. PATENT DOCUMENTS

| | | | |
|---|---|---|---|
| 3,533,730 | 10/1970 | Voltz et al. | 8/636 |
| 3,880,869 | 4/1975 | Scheuermann et al. | 546/51 |
| 4,299,959 | 11/1981 | Desai | 544/283 |

FOREIGN PATENT DOCUMENTS 1569 777  8/1970  Germany.

*Primary Examiner*—Fiona T. Powers
*Assistant Examiner*—Laura L. Stockton
*Attorney, Agent, or Firm*—Oblon, Spivak, McClelland, Maier & Neustadt, P.C.

[57] ABSTRACT

Benzopyran dyes of the formula

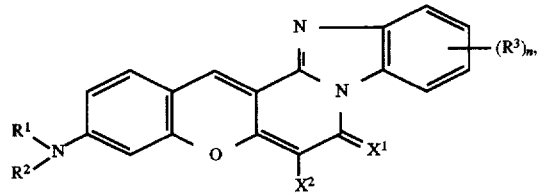

where n is 1 or 2, $X^1$ is oxygen or imino, $X^2$ is cyano or carbamoyl, $R^1$ and $R^2$ are independently of each other $C_1$–$C_{13}$-alkyl subject to the proviso that the sum total of the carbon atoms present in $R^1$ and $R^2$ shall be at least 10, and $R^3$ is hydrogen, $C_1$–$C_6$-alkyl, $C_1$–$C_6$-alkoxy, halogen, cyano, nitro, carbamoyl, mono- or di($C_1$–$C_4$-alkyl) carbamoyl, sulfamoyl or mono- or di($C_1$–$C_4$-alkyl) sulfamoyl, are obtainable from novel iminocoumarin intermediates and useful for dyeing or printing synthetic materials.

7 Claims, No Drawings

BENZOPYRAN DYES AND THEIR INTERMEDIATES

This application is a 371 of PCT/EP95/04658 filed Nov. 25, 1995.

The present invention relates to novel benzopyran dyes of the formula I

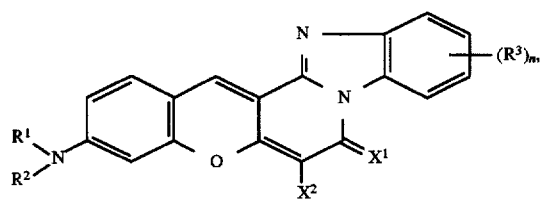

where n is 1 or 2, $X^1$ is oxygen or imino, $X^2$ is cyano or carbamoyl, $R^1$ and $R^2$ are independently of each other $C_1$–$C_{13}$-alkyl subject to the proviso that the sum total of the carbon atoms present in $R^1$ and $R^2$ shall be at least 10, and $R^3$ is hydrogen, $C_1$–$C_6$-alkyl, $C_1$–$C_6$-alkoxy, halogen, cyano, nitro, carbamoyl, mono- or di($C_1$–$C_4$-alkyl)carbamoyl, sulfamoyl or mono- or di($C_1$–$C_4$-alkyl)sulfamoyl, to iminocoumarins as their intermediates, and to the use of the novel dyes for dyeing or printing synthetic materials.

U.S. Pat. No. 3,880,869 discloses benzopyran dyes. However, it has been found that these products have unsatisfactory application properties, especially inadequate affinity.

It is an object of the present invention to provide novel benzopyran dyes which shall have advantageous application properties, especially excellent affinity.

We have found that this object is achieved by the above-defined benzopyran dyes of the formula I.

Any alkyl occurring in the abovementioned formulae may be straight-chain or branched.

$R^1$, $R^2$ and $R^3$ are each for example methyl, ethyl, propyl, isopropyl, butyl, isobutyl, sec-butyl, pentyl, isopentyl, neopentyl, tert-pentyl, hexyl or 2-methylpentyl.

$R^1$ and $R^2$ may each also be for example heptyl, octyl, 2-ethylhexyl, isooctyl, nonyl, isononyl, decyl, isodecyl, undecyl, dodecyl, tridecyl or isotridecyl. [The designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285).]

$R^3$ may also be for example methoxy, ethoxy, propoxy, isopropoxy, butoxy, isobutoxy, sec-butoxy, tert-butoxy, pentyloxy, isopentyloxy, neopentyloxy, tert-pentyloxy, hexyloxy, fluorine, chlorine, bromine, mono- or dimethylcarbamoyl, mono- or diethylcarbonyl, mono- or dipropylcarbamoyl, mono- or diisopropylcarbonyl, mono- or dibutylcarbamoyl, N-methyl-N-butylcarbamoyl, mono- or dimethylsulfamoyl, mono- or diethylsulfamoyl, mono- or dipropylsulfamoyl, mono- or diisopropylsulfamoyl, mono- or dibutylsulfamoyl or N-methyl-N-ethylsulfamoyl.

Preference is given to benzopyran dyes of the formula I where $R^1$ and $R^2$ are independently of each other $C_5$–$C_{13}$-alkyl, especially $C_5$–$C_{10}$-alkyl.

Preference is further given to benzopyran dyes of the formula I where $R^3$ is hydrogen, methyl or chlorine, especially hydrogen.

Preference is further given to benzopyran dyes of the formula I where $X^1$ is imino.

Preference is further given to benzopyran dyes of the formula I where $X^2$ is cyano.

The present invention further provides iminocoumarins of the formula II

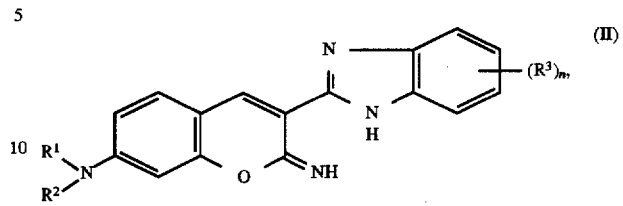

where n is 1 or 2, $R^1$ and $R^2$ are independently of each other $C_1$–$C_{13}$-alkyl subject to the proviso that the sum total of the carbon atoms present in $R^1$ and $R^2$ shall be at least 10, and $R^3$ is hydrogen, $C_1$–$C_6$-alkyl, $C_1$–$C_6$-alkoxy, halogen, cyano, nitro, carbamoyl, mono- or di($C_1$–$C_4$-alkyl)carbamoyl, sulfamoyl or mono- or di($C_1$–$C_4$-alkyl)sulfamoyl.

The iminocoumarins of the formula II are obtainable in a conventional manner, for example by condensing an aminosalicylaldehyde of the formula III

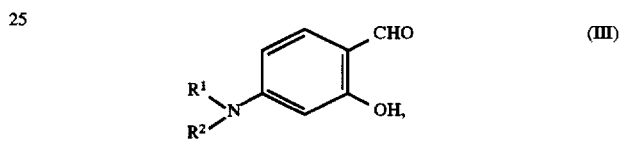

where $R^1$ and $R^2$ are each as defined above, with a cyanomethylbenzimidazole of the formula IV

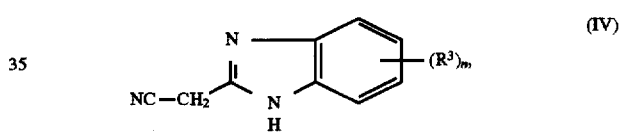

where n and $R^3$ are each as defined above.

The condensation, as described for example in U.S. Pat. No. 3,533,730 or U.S. Pat. No. 4,299,959, is generally carried out in a diluent (eg. alcohol or N,N-dimethylformamide) in the presence of a base (eg. piperidine or pyrrolidine) at room temperature or elevated temperature.

The iminocoumarins of the formula II are useful intermediates for preparing the benzopyran dyes of the formula I.

To prepare the benzopyran dyes of formula I, an iminocoumarin of the formula II is condensed in a diluent with malonitrile or a $C_1$–$C_6$-alkyl cyanoacetate.

This method is known per se and described for example in U.S. Pat. No. 3,880,869.

The novel benzopyran dyes of the formula I are advantageously useful for dyeing or printing synthetic materials, for example polyesters, polyamides or polycarbonates. Particularly suitable are materials in textile form, such as fibers, yarns, threads, knits, wovens or nonwovens composed of polyester or polyamide or else a polyester-cotton blend. The benzopyran dyes of the present invention are further suitable for dyeing keratinous fibers, for example hairs or furs.

The benzopyran dyes of the present invention are notable for good affinity. They produce brilliant, fluorescent dyeings and prints in red hues.

The Examples which follow illustrate the invention.

EXAMPLE 1

To 400 ml of methanol were added 41.6 g of 2-imino-3-(benzimidazol-2-yl)-7-dipentylaminocoumarin, 8.6 g of malonitrile and 3 g of formic acid. This mixture was refluxed for 12 h with stirring. It was then cooled down and the resulting precipitate was filtered off with suction, washed with methanol and dried, leaving 42.3 g of the dye of the formula

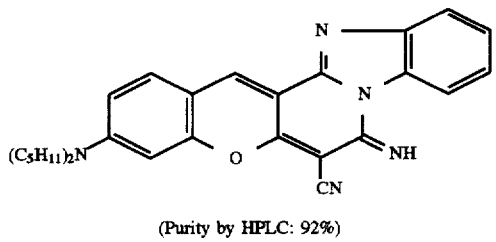

(Purity by HPLC: 92%)

EXAMPLE 2

To 400 ml of methanol were added 44.4 g of 2-imino-3-(benzimidazol-2-yl)-7-dihexylaminocoumarin, 8.6 g of malonitrile and 3 g of formic acid. This mixture was heated with stirring in an autoclave to 100°–105° C. under an eventual autogenous pressure of from 3 to 3.2 bar. Stirring was continued at the stated temperature for 2 h, when the mixture was cooled down and decompressed. The resulting precipitate was filtered off with suction, washed with methanol and dried, leaving 44.4 g of the dye of the formula

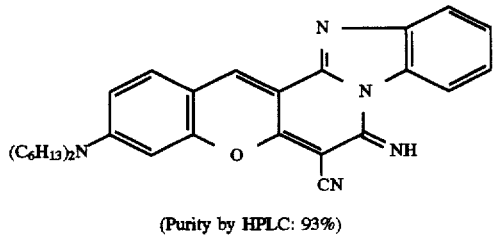

(Purity by HPLC: 93%)

EXAMPLE 3

Example 2 was repeated with a reaction time of only 1 h, affording a similar result.

EXAMPLE 4

Example 2 was repeated with only 1 g of formic acid as catalyst, affording a similar result.

EXAMPLE 5

Example 1 was repeated with 1 g of titanium tetraethoxide as catalyst, affording a similar result.

EXAMPLE 6

Example 2 was repeated with 47.2 g of 2-imino-3-(benzimidazol-2-yl)-7-diheptylaminocoumarin, affording 48.2 g of the dye of the formula

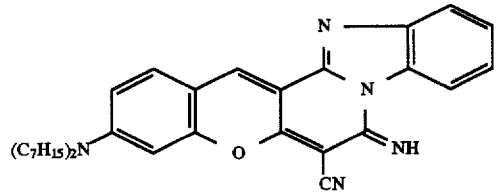

(Purity by HPLC: 92.5%)

EXAMPLE 7

Example 1 was repeated with the 8.6 g of malonitrile replaced by 14.7 g of ethyl cyanoacetate, affording 43.0 g of the dye of the formula

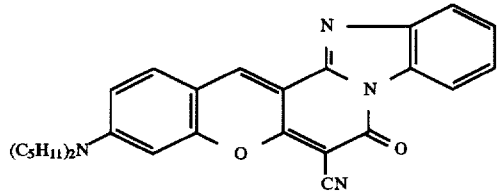

(Purity by HPLC: 91%)

EXAMPLE 8

Example 2 was repeated with 43.0 g of 2-imino-3-(benzimidazol-2-yl)-7-(N-pentyl-N-hexylamino)coumarin, affording 43.4 g of the dye of the formula

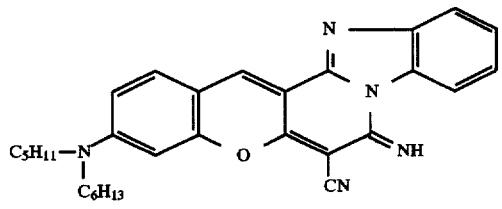

(Purity by HPLC: 93.4%)

EXAMPLE 9

15.7 g (0.1 mol) of 2-cyanomethylbenzimidazole and 27.7 g (0.1 mol) of 4-dipentylaminosalicylaldehyde were combined in 100 ml of methanol, admixed with 1 ml of pyrrolidine and stirred at 40° C. for 3 h. After cooling down to room temperature, the precipitate was filtered off with suction and washed with 40 ml of methanol, leaving 26.8 g of a compound of the formula

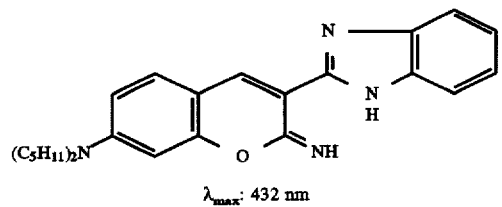

$\lambda_{max}$: 432 nm

The method of Example 9 also affords the iminocoumarins listed in the following table:

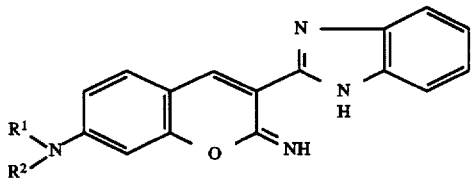

| Ex. No. | $NR^1R^2$ |
| --- | --- |
| 10 | $N(C_6H_{13})_2$ |
| 11 | $N(C_7H_{15})_2$ |

-continued

| Ex. No. | NR$^1$R$^2$ |
|---|---|
| 12 | 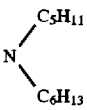 |

We claim:

1. A benzopyran dye of the formula I

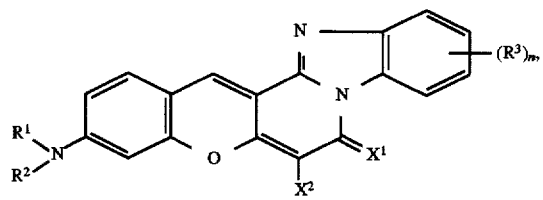

where n is 1 or 2,

X$^1$ is oxygen or imino,

X$^2$ is cyano or carbamoyl,

R$^1$ and R$^2$ are independently of each other C$_1$–C$_{13}$-alkyl subject to the proviso that the sum total of the carbon atoms present in R$^1$ and R$^2$ shall be at least 10, and R$^3$ is hydrogen, C$_1$–C$_6$-alkyl, C$_1$–C$_6$-alkoxy, halogen, cyano, nitro, carbamoyl, mono- or di(C$_1$–C$_4$-alkyl) carbamoyl, sulfamoyl or mono- or di(C$_1$–C$_4$-alkyl) sulfamoyl.

2. A benzopyran dye as claimed in claim 1 wherein R$^1$ and R$^2$ are independently of each other C$_5$–C$_{13}$-alkyl.

3. A benzopyran dye as claimed in claim 1 wherein R$^3$ is hydrogen, methyl or chlorine.

4. A benzopyran dye as claimed in claim 1 wherein X$^1$ is imino.

5. A benzopyran dye as claimed in claim 1 wherein X$^2$ is cyano.

6. An iminocoumarin of the formula II

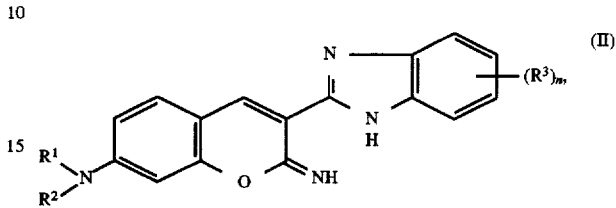

where n is 1 or 2,

R$^1$ and R$^2$ are independently of each other C$_1$–C$_{13}$-alkyl subject to the proviso that the sum total of the carbon atoms present in R$^1$ and R$^2$ shall be at least 10, and R$^3$ is hydrogen, C$_1$–C$_6$-alkyl, C$_1$–C$_6$-alkoxy, halogen, cyano, nitro, carbamoyl, mono- or di(C$_1$–C$_4$-alkyl) carbamoyl, sulfamoyl or mono- or di(C$_1$–C$_4$-alkyl) sulfamoyl.

7. A method comprising dyeing or printing synthetic materials with the benzopyran dye of claim 1.

* * * * *